July 29, 1941.  A. W. MILLER  2,251,253
CLAMPING CONNECTION
Filed April 22, 1940   2 Sheets-Sheet 1
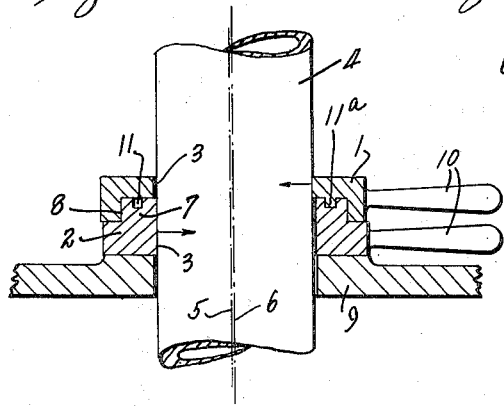
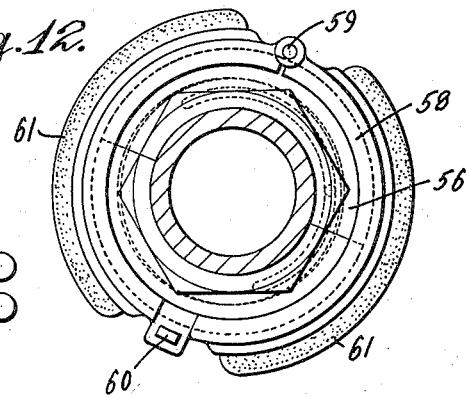
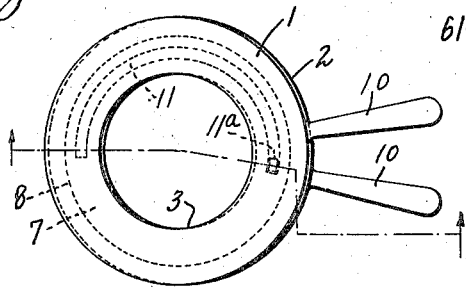
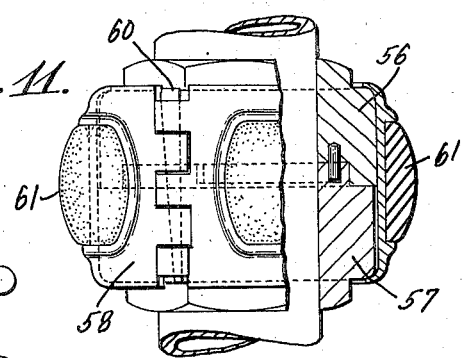
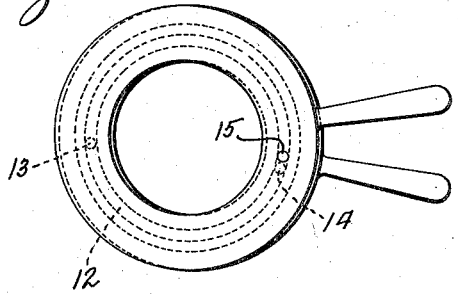
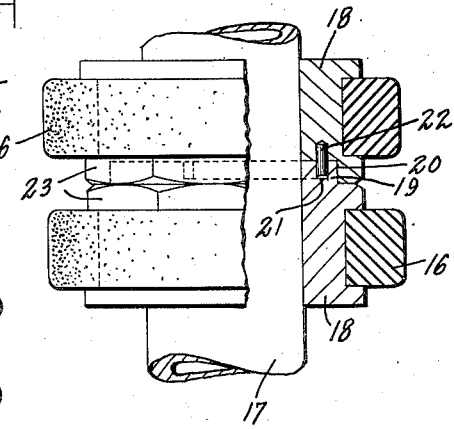
INVENTOR.
Albert W. Miller
BY
Lyon & Lyon
ATTORNEYS.

July 29, 1941.　　A. W. MILLER　　2,251,253
CLAMPING CONNECTION
Filed April 22, 1940　　2 Sheets-Sheet 2

INVENTOR.
Albert W. Miller
BY
Lyon & Lyon
ATTORNEYS.

Patented July 29, 1941

2,251,253

UNITED STATES PATENT OFFICE 2,251,253

CLAMPING CONNECTION

Albert W. Miller, Jamaica, N. Y.

Application April 22, 1940, Serial No. 330,859

7 Claims. (Cl. 285—30)

This invention relates to a clamping connection capable of many uses in mechanical structure.

An object of the invention is to provide a simple connection including two relatively rotatable parts having openings therein enabling the device to be placed over a bar or central clamped member having a smooth unthreaded outer face, and to provide a construction whereby a relative rotation through a given angle will operate to clamp the two members rigidly on the inner bar or central member; also to construct the parts in such a way that the clamp will be substantially unaffected by vibration, and will continue to maintain itself in its tightly clamped condition.

A further object of the invention is to provide an embodiment of the invention adapting the same for use as a coupling for securing together aligned tube sections or pipe members.

A further object of the invention is to provide an embodiment of the invention, enabling the same to be used as a clamp for backing up a follower plate movably mounted on a guide bar.

A further object of the invention is to provide an embodiment of the same adapting the invention to be used as a clamping collar on shafting, for holding a pulley in place.

A further object of the invention is to provide an ordinary threaded coupling or union with means for locking its threaded connection against working loose from vibration.

Further objects of the invention will appear hereinafter.

The invention consists in the novel parts and combination of parts to be described hereinafter, all of which contribute to produce an efficient clamping connection.

A preferred embodiment of the invention is described in the following specification, while the broad scope of the invention is pointed out in the appended claims.

In the drawings:

Fig. 1 is a vertical section through a clamping connection embodying my invention, and showing the clamped member in elevation and broken away.

Fig. 2 is a side elevation of the parts shown in Fig. 1, but omitting the clamped member.

Fig. 3 is a view similar to Fig 2, but illustrating a modified embodiment of the stop means for limiting the relative rotation of the collars.

Fig. 5 is a side elevation and partial section illustrating an adaptation of the invention for clamping guard collars onto a drill pipe, such as employed on drill rod or tubing to protect the road in drilling deep wells.

Fig. 11 is a side elevation and partial section illustrating a modification of the guard device shown in Fig. 5.

Fig. 12 is a plan of the parts shown in Fig. 11.

Figure 6:
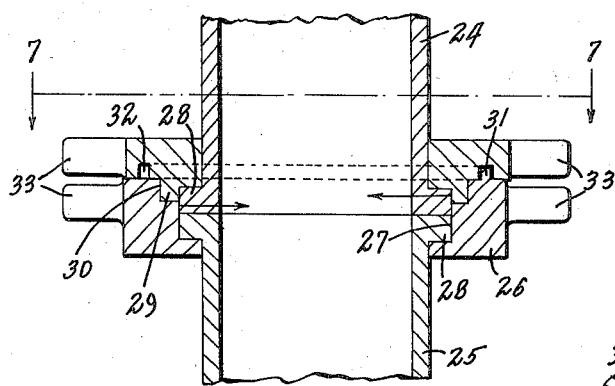
Fig. 6 is a vertical section illustrating an adaptation of the invention to a coupling for connecting the abutting ends of two pipe sections.

In the embodiment of the invention shown in Fig. 1, I provide two clamping members 1 and 2 preferably in the form of collars having openings 3 through the same, to receive a clamped member 4 which may be in the form of a bar.

Between the abutting sides of the collars 1 and 2, I form an eccentric connection, the axis 5 of which is slightly eccentric to the axis 6 of the bar 4. For this purpose I prefer to provide an eccentric boss 7 on one of the collars, and an eccentric socket 8 on the other socket to receive it. When the eccentric connection is in its neutral position, the openings 3 are in true alignment with each other. In this position the collars are slipped over the bar and against any part that is to be clamped up, such as a follower plate 9. The collars are, of course, capable of relative rotation. In the present instance, they are provided with handles 10 for relatively rotating them. This will cause them to clamp the bar by exerting forces as indicated by the arrows in Fig. 1.

Figure 4:
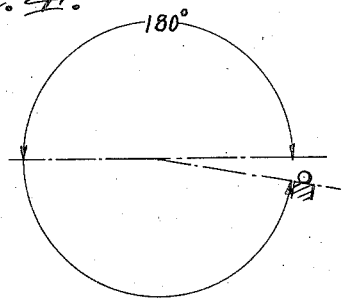
Fig. 4 is a diagrammatic view illustrating the principle on which the clamping connection operates.
Figure 7:
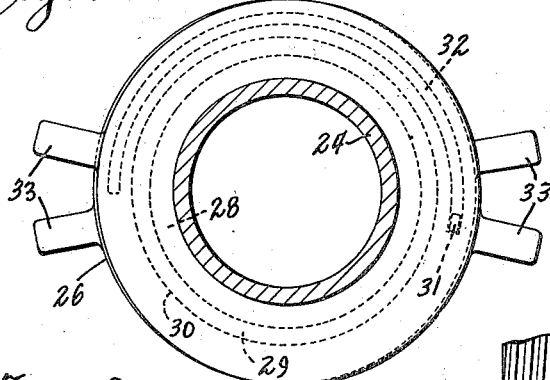
Fig. 7 is a horizontal section on the line 7—7 of Fig. 6.

In accordance with my invention, the eccentricity is such as to permit a relative rotation of the collars, by using considerable force, through 180°, in which relation the collars will clamp the bar very tightly; and I provide means for limiting the relative rotation of the collars slightly beyond the 180° position. Any suitable means may be employed for this purpose. In the present instance, I use a stop in the form of a projection or dog 11a on one of the collars that runs in a groove 11 in the other collar. This groove extends through slightly more than 180°. When the dog 11a is stopped at the far end of the groove in the tight position of the clamp illustrated in Fig. 1, the clamp cannot be loosened by vibration because the clamp would have to become tighter before it became looser. In other words, it would require a positive force to rotate the upper collar 1 back past the 180° position. This rotation is illustrated diagrammatically in Fig. 4. There should be lateral clearance between the dog 11a and the sides of the groove 11, so that the dog is not subjected to any strain when the collars are clamped up.

Instead of having the groove extend part way around the circumference, I may turn a continuous groove 12 in one of the collars and provide it with two stop pins 13 and 14; and provide the other collar with a pin 15 (see Fig. 3) to ride in the groove. In Fig. 3 this stop pin is illustrated up against the stop pin 14 as in the tight position of the clamp.

This invention may be employed for securing protective buffer rings 16 of rubber or similar material, to a drill rod or drill tube 17 (see Fig. 5). In this view the two buffer rings 16 are mounted on two collars 18 with an eccentric connection between them constructed as illustrated in Fig. 1, and including an eccentric hub or boss 19 received in an eccentric bore 20, one of the collars 18 having a groove 21 receiving a stop dog or pin 22 on the other collar. The collars may have hexagonal ends 23, or be provided with flat faces to enable wrenches to be used for clamping up the collars.

In Fig. 6 I illustrate the invention adapted to a coupling for securing abutting ends of pipe sections 24 and 25 together. In this adaptation the collar 26 has a bore 27 to receive the pipe flanges 28, and an eccentric boss 29 is formed on the other collar received in an eccentric socket 30. By relatively rotating the collars through more than 180°, until the dog 31 arrives at the end of the groove 32, the two collars can be clamped on the upper or outer flange 28 in the bore 27, clamping forces being developed by the eccentricity as indicated by the arrows in Fig. 6. The collars may be provided with handles 33 for rotating them.

Figure 8:
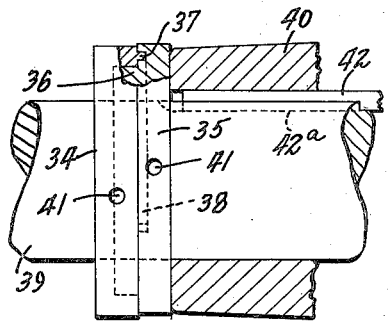
Fig. 8 is a side elevation and partial section illustrating an adaptation of the invention to a collar for shafting, and engaging the end of the hub of a pulley to hold it in place on the shaft. The shaft is shown broken away.

In Fig. 8 I illustrate a clamping connection including two collars 34 and 35 with an eccentric connection 36 between the same, constructed as illustrated in Fig. 1 and having a stop dog 37 on one of the collars running in a groove 38 in the other collar. This view illustrates the collars as clamping a line shaft 39 to act as a stop for one end of the hub 40 of a pulley. A similar clamp connection would be used at the other end of the hub 40. The collars 34 and 35 may be provided with sockets 41 for enabling a spanner wrench to be used to tighten up the collars. The collars would not interfere with the use of a short key 42 for the pulley lying in a key seat 42a cut in the side of the shaft 39.

It should be understood that in all the adaptations of the invention, there are axially aligned clamped means including a part capable of being slid through the aligned openings. Generally the eccentricity of the eccentric connection would usually be only a few thousandths of an inch. In any case it should be such that the connection can be forced with considerable force, slightly beyond the 180° position, to come to rest in this position through the agency of the stop. In the drawings, the eccentricity is greatly magnified for illustrative purposes.

Figure 9:
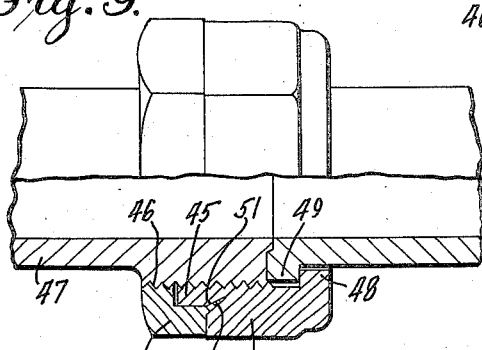
Fig. 9 is a side elevation and half section indicating the application of the invention to a threaded coupling for connecting the ends of pipe sections together.
Figure 10:
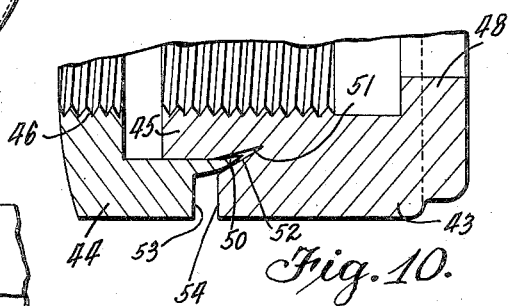
Fig. 10 is a section broken away, of one side of a coupling nut, and illustrating means that may be employed for holding the two sections of the nut yieldingly in a fixed relation to each other.

The invention is applicable to a coupling or pipe union. This is illustrated in Fig. 9, in which 43 indicates the body of the nut, and 44 indicates the collar that constitutes a part of the nut. This collar 44 is formed with an eccentric bore to be received on an eccentric boss 45 at the outer end of the body 43. The body 43 is, of course, threaded internally to enable it to be screwed onto the upset threads 46 on the pipe end 47, so as to enable the shoulder 48 at the inner end of the nut member 43 to engage the pipe flange 49 and seat the same firmly against the end of the pipe 47. The nut members 43 and 44 are held yieldingly in a neutral position with respect to their axes of eccentricity before the two nut members are screwed onto the thread 46. This may be accomplished by employing a thin fin 50 on the collar that is received in a slightly angled or inclined groove 51. The fin 50 is, of course, an extension of the wall in the bore that fits over the boss 45. By pressing the collar 44 into place on the body 43 with the axes of eccentricity aligning, the end of the fin 50 will be bent laterally by engaging the inclined face 52 of the angular groove 51. This interlocking of the fin and the groove, due to the resiliency of the fin, will hold the two nut parts forcibly yet yieldingly in their proper relation to enable the coupling nut to be applied to the thread 46. After this is done and the flange 49 seated tight against the end of the pipe 47, then the collar 44 is rotated through an angle of slightly more than 180°, this angle being determined by the distance between the faces 53 and 54, and as indicated in Fig. 10. This distance is slightly more than half the distance between the two adjacent peaks on the thread 46. When these faces come together as indicated in Fig. 9, the nut member 44, of course, will stop and cannot back off because in doing so it would have to tighten itself on the eccentric boss 45.

The construction shown in Fig. 5 may be modified to enable it to be applied to a drill rod or tubing with upset ends larger than the diameter of the body of the rod or tubing. This is illustrated in Figs. 11 and 12.

In this case, I form the device of two split collars 56 and 57 having the same eccentric connection as illustrated in Fig. 5. After these split collars are applied on the drill tubing, they are held in place by an outer split collar 58 that envelops them. This outer collar 58 has a hinge 59 on one side and a wedge pin connection 60 on the other side. This outer collar envelops the two inner collars 56 and 57 and permits their relative rotation through the agency of their hexagonal ends. Rubber buffers 61 are carried on the outer ring 58. When one of the inner collars is rotated relatively to the other, the collars will clamp the drill pipe and they will also exert an expanding effect on the outer collar or sleeve 58, and as the eccentric connection will be arrested in its rotation beyond the 180° position, the connection will not work loose from vibration.

Many other embodiments of the invention may be resorted to without departing from the spirit of the invention.

What I claim is:

1. In a clamping connection, the combination of a pair of abutting clamp members with aligning openings, rotatable with respect to each other, axially aligned clamped means including a part capable of passing through said openings, said clamping members having an eccentric connection between the same, eccentric to the axis of said clamped member, said eccentric connection having a neutral position in which the said part of the clamped means can be slid into the openings, said eccentric connection capable of rotation beyond the angle at which the maximum lateral displacement of said clamp members occurs, and a stop for limiting the relative rotation of said clamping members after being rotated beyond the said angle of maximum relative lateral displacement of the eccentric connection, whereby a resistance to rotation in a reverse direction is set up.

2. In a clamping connection for clamping up a follower plate or the like, the combination of a bar, a pair of collars having aligning openings receiving the bar, an eccentric connection between the adjacent sides of said collars capable of assuming a neutral position in which the openings in the collars are in axial alignment with each other, said eccentric connection being capable of rotation through more than 180 degrees, means associated with the collars for effecting a relative rotation of the collars with respect to each other to clamp them on the bar, and stop means for limiting the relative rotation of the collars when one of the collars has been rotated through more than 180° from the neutral position.

3. In a clamping connection for clamping up a follower plate or the like, the combination of a bar having a smooth outer surface, a pair of collars having aligning openings receiving the bar, an eccentric connection between the adjacent sides of said collars capable of assuming a neutral position in which the openings in the collars are in axial alignment with each other, said eccentric connection being capable of rotation through more than 180 degrees, said collars having handles for effecting a relative rotation of the same with respect to each other to clamp them on the bar; and stop means for limiting the relative rotation of the collars when the collars have been relatively rotated through more than 180° from the neutral position.

4. In a clamping connection to be used as a coupling for connecting the abutting ends of pipe sections, the combination of a pair of collars, one of said collars being rotatably mounted on the end of one of said pipe sections, and the other collar being rotatably mounted on the end of the other pipe section and having a bore receiving the ends of the pipe section on which it is mounted, and extending along the side face of the end of the opposite pipe section, an eccentric connection between said collars capable of assuming a neutral position in which both ends of the pipe sections will fit into the said bore, said eccentric connection being capable of rotation through more than 180 degrees, said collars having means for effecting a relative rotation of the same on the eccentric connection to clamp the collars on the pipe ends; and stop means for limiting the relative rotation of the collars beyond the 180° position.

5. In a clamping connection to be used as a coupling for connecting the abutting ends of flanged pipe sections, the combination of a pair of collars, one of said collars being rotatably mounted on one of the flanges, and the other collar being rotatably mounted on the other flange and having a bore receiving the flange of the pipe section on which it is mounted and extending partially across the flange of the opposite pipe section, an eccentric connection between said collars capable of assuming a neutral position in which the flange on the said other tube section will fit into the said bore, said eccentric connection being capable of rotation through more than 180 degrees, said collars having means for effecting a relative rotation of the same on the eccentric connection to clamp the collars on the flanges; and stop means for limiting the relative rotation of the collars when the collars have been relatively rotated through more than 180° from the neutral position.

6. In a clamping connection to be used as a stop collar on a shaft for the end of a pulley boss keyed to the shaft, the combination of a pair of abutting collars mounted on the shaft adjacent the end of the pulley boss, said collars having an eccentric connection between the same capable of assuming a neutral position and having openings through the same in alignment with each other when the eccentric connection is in the neutral position to permit the collars to be slipped over the shaft; said eccentric connection capable of rotation through more than 180 degrees; and stop means for limiting the relative rotation of the collars when one of the collars has been rotated through more than 180° from the neutral position to clamp the collars on the shaft.

7. In a pipe coupling, the combination of a pipe member having threads adjacent its end, a second pipe member having a flange adjacent its end, a coupling nut including a part carrying the flanged pipe and threaded to screw on the threads of the other pipe, another nut member internally threaded to screw on the threads of the pipe, an eccentric connection between the two nut members, said nut members being capable of a relative rotation past the 180° position of said eccentric connection; and stop means for limiting the relative rotation of the nut members beyond the 180° position of the eccentric connection.

ALBERT W. MILLER.